United States Patent
Slater et al.

(10) Patent No.: US 7,770,199 B2
(45) Date of Patent: Aug. 3, 2010

(54) MEDIA PLAYING

(75) Inventors: Alastair Michael Slater, Malmesbury (GB); Andrew Michael Sparkes, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2266 days.

(21) Appl. No.: 10/390,161

(22) Filed: Mar. 18, 2003

(65) Prior Publication Data

US 2004/0073693 A1    Apr. 15, 2004

(30) Foreign Application Priority Data

Mar. 18, 2002   (GB)   .................................. 0206404.6

(51) Int. Cl.
    *H04N 7/173* (2006.01)
(52) U.S. Cl. ........................................ 725/94
(58) Field of Classification Search ............... 725/94, 725/231; 709/94, 231
    See application file for complete search history.

(56) References Cited

U.S. PATENT DOCUMENTS 5,737,747 A * 4/1998 Vishlitzky et al. ........... 711/118
5,815,146 A * 9/1998 Youden et al. ............... 715/720
5,829,046 A   10/1998 Tzelnic et al.
5,996,015 A   11/1999 Day et al.
6,298,385 B1  10/2001 Sparks et al.
2002/0015249 A1  2/2002 Takayama et al.

FOREIGN PATENT DOCUMENTS

| EP | 0 646 874 A1 | 4/1995 |
| EP | 0 701 371 | 4/2000 |
| WO | 01/73639 A1 | 10/2001 |

* cited by examiner

*Primary Examiner*—Joseph P Hirl
*Assistant Examiner*—Jivka Rabovianski (57) ABSTRACT

A fast access storage device, e.g., a disc, stores initial portions of many movies. A tape library stores many tapes, for the remainder of each movie. A controller controls drives for the disc and tape so the remainder of a particular movie is read from the tape after the initial portion of a particular movie is read from the disc so a viewer is unable to perceive that the movie is recorded on the disc and tape and can start watching the movie sooner than if the movie were recorded only on a tape.

37 Claims, 6 Drawing Sheets

VIDEO PERFORMANCE    TAPE

MEDIA PLAYING

RELATED APPLICATION

The present application is based on, and claims priority from, GB Application Number 0206404.6, filed Mar. 18, 2002, the disclosure of which is hereby incorporated by reference herein in its entirety.

FIELD OF THE INVENTION

The present invention relates to the playing of rich media (i.e. media which is more complex than just text, e.g. that includes pictures, audio etc.). A common rich media is video. More particularly, but not exclusively, the invention relates to a method of and apparatus for playing a rich media file to a memory for controlling playing of a rich medium file and to a fast access medium storing an initial portion of memory received media files.

BACKGROUND ART

It is known to store rich media files, such as movies, as video files for streaming media playing stored online on disc. While it is convenient to describe the problems resolved by the invention and a preferred embodiment of the invention in relation to the playing of videos, the invention is applicable more widely to any rich media having a large data file, typically accessed sequentially. Different formats (e.g. REAL MEDIA and WINDOWS STREAMING, and QUICK TIME) store videos of movies on disc at commercial Video Farms.

Play devices capable of playing back video of these different formats exist. It is possible to have Video-on-Demand by remotely accessing a Video Farm, and an appropriate magnetic disc, via telecommunications links (e.g. the Internet or World-wide Web). Upon accessing a Video Farm a user's play device negotiates with a control computer at the Video Farm to select the correct video format for the user's play device and to agree on a bit rate (typically 56 kbit/s, or 128 kbit/s, or 256 kbit/s). The Video Farm computer then selects the correct disc memory with the movie stored at the correct bit rate and in the correct format and downloads the movie to the user.

This is expensive in memory. For each movie the memory needs to store multiple copies to cater different formats and bit rates. In the case of three formats and three bit rates this is nine copies. Video Farms typically use high quality fault tolerant magnetic disc arrays which have good reliability but which are expensive per gigabyte (GB) of video stored. It is possible to use cheaper disc drives such as single spindle EIDE disc drives such as may be found in a PC, but they are not fault tolerant and can be a point of failure in the delivery of Video-on-Demand.

It is of course known to store video on tape, but this is not used for the on line provision of video movies because of the long latency time that is inherent with tape: it takes time for a tape library to locate the correct tape, retrieve it and put it into a tape drive, and begin playing the tape. Many customers are not prepared to wait and so Video-on-Demand is provided using disc memory storage at the Video Farm.

It is an aim of at least some aspects of the invention to provide an improved way of delivering rich media. In many embodiments the invention aims to provide a cheaper way of providing rich media than by using fault tolerant disc arrays to store the data.

SUMMARY OF THE INVENTION

According to a first aspect, the invention comprises a method of playing a rich media file wherein a first part of said file is on a fast access memory device and a second part of said file is on a slow access memory device; the method comprises readying said slow access memory device for playing;

playing an output derived from said first part from said fast access memory device while said slow access memory device is being readied for playing;

playing an output derived from said second part from said slow access memory device; and synchronizing said playing of said outputs derived from said first part and said second part so said outputs derived from said first and said second parts play contiguously.

Examples of the slow access memory devices are magnetic tape and DVD video playback devices. By using the invention as set forth above, a user does not have to wait for a tape or DVD video to be found, inserted into a tape or DVD drive, and begun to be played before the user can receive the start of a rich media file. The user can receive the start of the rich media file from the fast access memory, which can deliver to the user the start of the file during a period of latency associated with the tape or DVD video, before tape or DVD video-derived data can be delivered.

By the time the tape or DVD has been located, introduced into a tape or DVD drive, or otherwise readied for playing, the user would have already had delivered to him part of the file from the fast access memory device. It is therefore desirable to deliver to the user from the tape or DVD that part of the file that the user has not already received from the fast access memory. Determining the point at which the data received by the user should change from being data derived from the fast access memory to data derived from the slow access memory requires synchronization.

In much of the present document the term "readied for playing" in connection with the slower access memory device, means having a correct slow access medium (e.g., a tape) in a drive. Getting the slow access medium in the drive typically involves finding the correct slow access medium in a slow access medium library, physically moving it to the location of the slow access medium drive, inserting it into the slow access medium drive, and advancing the slow access medium to the correct place to begin playing the data from the slow access medium. The same concept of providing a fast-access, in many cases substantially immediate, delivery of the initial part of the data file can be provided by using an electronic computer memory while the remainder of the file in a slower access memory is read into a temporary buffer file. The second, slow access part of the file can also be supplied to a user from a remote data store over telecommunications lines. Accessing a remote data store over telecommunications lines sometimes has an associated delay. Storing and outputting an initial part of the data file locally from a local data store can provide a breathing space to allow time for the second part of the data file to be located, and transmitted to the user for "stitching" together with the locally stored initial part of the data file. Indeed, if the second, or later part of the data file is present at a remote site requiring access via telecommunications, there is no need to send the second part of the file to the device that contains the first part of the file for merging; the merging could happen at the users end. To this end, a user's device includes a synchronization buffer, or other synchronizer.

Many embodiments of the invention allow for the use of a fast initial playing response (i.e. from a disc or other fast access memory) while the majority of the data file is expected to come from the cheaper tape, thereby allowing the use of a significantly smaller amount of more expensive fast access memory in the process than if the whole file were stored in fast access memory.

Preferably the fast access memory device is electronic computer memory, such as a magnetic disc (e.g. a hard drive), but it could be chip-based memory, or optical memory, or any memory that can deliver the desired data faster than the rich media file can be retrieved from a tape or DVD library.

The first part of the rich medium file typically has first sequential data having an end and the second part of the rich medium file typically has second sequential data having a start. Data towards the end of the first part in one embodiment includes end region data which are substantially the same data as data in a start region at the start of the secondary part. Playing of the end region data of the first part of a particular file and playing of the start region data of the second part of the particular file is in one embodiment synchronized by playing the end region data and/or start region data through a buffer.

The method preferably comprises advancing the slow access medium to a position which corresponds to the slow access medium data which is forward of data from the fast access memory which is being supplied to a receiver. The method comprises reading data which is representative of a location on the slow access medium to which the slow access medium needs to be advanced to catch up, or overtake, the data output from the fast access memory device. Advantageously an, initial read of "slow access medium-advancement" data on the slow access medium indicates where the slow access medium needs to go to 'catch up' (and preferably overtake) the stream of data from the fast access medium. The data representative of the location on the slow access medium to which the slow access medium needs to be advanced is stored in electronic memory and is read by a control processor. For example the slow access medium-advancement data are stored in the memory of a processor, for example on disc or solid state memory. An alternative is to store the data relating to the location on the slow access medium of the video or other data file (or of a relevant part of the file) on the slow access medium itself (e.g. in a header). When a slow access medium is added to a library of slow access mediums (and it is possible to add slow access mediums to an existing library, or change the slow access mediums in a library), the slow access medium is read and the information identifying where on the slow access medium particular data files, or parts of them, is to be found is stored to an address memory in a processor-accessible memory (e.g. processor memory). There can be file marks on the slow access medium against movie chapters, and a concordance table of the file marks and movie chapters can be stored.

Preferably data are transferred from the slow access medium into a buffer. This transfer of data is preferably achieved by playing the slow access medium so that the slow access medium outputs the data file at a higher than normal playing speed (as perceived by the viewer/user) into the buffer. A normal playing speed is the speed which results in the data being played back to a viewer/listener at the speed which the producer of media intended.

In many embodiments, the slow access medium drive streams data much faster than is required for viewing a movie. The data are therefore directed to a cache and then played out at the correct rate. It may take only 5, 10, 15, 20, or so minutes to stream a 1½ hour video movie to a buffer cache. Data from the tape thus accumulates in the buffer so that a particular portion of the data can be subsequently retrieved from the buffer.

In one embodiment, the first part and second part of the file are played through the buffer having a first part data input, a second part data input and a datastream output. Data from the datastream output can be changed at one point in time from originating from the first part data to originating at a later point in time from the second part data input.

The output derived from the slow access memory and/or fast access memory can include signals present in the data of the first and/or second parts of the file. Alternatively, or additionally, the output can comprise the file data of the rich media product, or a parameter or signature derived therefrom; the parameter or signal includes identifying bits to enable the computer to match a place in the slow access memory data with an equivalent place in the fast-access memory data. The slow and fast access data are the same as the equivalent places.

The method desirably comprises comparing the output derived from the fast access memory with an output derived from the slow access memory and ensuring that both of said outputs are synchronous. This is preferably performed using a buffer memory to effect synchronization.

The method, in one embodiment, comprises comparing the temporal occurrence of synchronization data associated with data from the fast access memory with the temporal occurrence of synchronization data associated with data from the slow access memory (which is in many examples in a buffer). An indication that synchronization has been achieved is provided by detecting that the synchronization data coincide.

The data in the fast access memory can be stored in a buffer before being transmitted to a receiver. As portions of slow access memory data are stored in the buffer, time data representing the temporal positions of slow access memory data portions can also be stored. Such time data enables particular portions of the tape data to be easily located in the buffer during the synchronization process.

Preferably the rich media data file is representative of video material or of audio material.

The portion of a data file, e.g. video movie, stored on fast access memory (e.g. disc) compared to that stored on slow access memory (e.g. tape) is usually small. For example 5 minutes out of a 90 minute movie is about 7%. The proportion is usually of the order of: 20% or less, 15% or less, 10% or less, 8% or less, 5% or less, 3% or less, 1% or less. The comparison as previously discussed is intended to be the play time as perceived by the user/viewer, but could be on any basis related to memory capacity (e.g. bits stored).

The first part stored in the fast access memory typically has a play time, as perceived by the user, of the order of a few minutes. Each said second part can be provided on its own respective separate tape.

According to a second aspect, the invention comprises a media playing device for playing a media product file, wherein said device comprises a fast access memory, a slow access memory drive, a control processor, and an output line adapted to output a media datastream. The fast access memory is capable of storing data representative of an initial portion of said media product file and the slow access memory drive is capable of reading data from a slow access medium including data representative of at least a later portion of said media product file. Said control processor is arranged, upon receiving a request for playing of said media product file, to (1) play data from said fast access memory over said output line, (2) prepare said tape for playing of said later portion of said media product file from said slow access memory drive, while said initial portion is playing, and (3) switch data that is output on said output line from originating from said fast access memory to originating from said slow access memory drive.

The fast access memory usually has stored therein data representative of said initial portion of the media product, which, for example, has a playing duration of up to 10 or 15 minutes or between one and ten minutes. Preferably the fast access memory has data stored therein which is representative of an initial portion which has a playing duration of approximately five minutes. The playing duration of the initial portion is in any case desirably sufficient to enable the correct slow access medium to be located, loaded into a tape drive, and for the stages of the synchronization process to be carried out.

The data stored in the slow access medium preferably comprise a data portion which is temporally and/or sequentially contiguous with a data portion stored in the fast access memory. Thus the slow access medium provides continued data output to a client from the point in a datastream where the output from the data in the fast access memory is switched or where the initial portion data in the fast access memory terminates. There is most preferably some overlap in the data stored in the fast access memory and that stored in the tape (but not necessarily so).

The data stored in the fast access memory and that stored in the slow access medium are preferably provided with synchronization data. Such synchronization data allows two streams of data derived from the fast access memory and slow access medium to be compared or a synchronous switchover can be achieved. The synchronous switchover is preferably done in a buffer for a cost-effective real system. It is to be understood that the switching of output origin without a buffer is also within the inventive concept. Because a typical slow access medium drive cannot usually react fast enough, playing the slow access medium through a buffer is preferred.

It is desirable for a greater proportion of the media product to be stored in the slow access medium as compared to that proportion which is stored in the fast access memory. A "greater portion" is at least 50%, and preferably at least 60%, 70%, 80%, 90% or 95%. In a preferred embodiment the amount of data stored in fast access memory is at least as much, and not significantly more than, the amount of data necessary to deliver the initial portion of the data file while said tape is readied for playing and while synchronization of data is achieved. Once synchronization has happened there is no need for more data in the fast access memory and having more data in the fast access memory could be considered to be a waste of computer memory, and unnecessarily expensive.

The output of the device is usually adapted to be connected to a telecommunications device or channel.

According to a third aspect, the invention comprises a machine readable data carrier which, when operational in a control processor controlling the input to an output line of a media playing device having a slow access medium drive and a fast access memory each accessing a respective data file, causes the output line at a first time to output signals from the fast access memory and subsequently to output signals from the slow access medium drive.

Data is derived from the tape when the data from the slow access medium has caught up with data from the fast access memory.

The machine readable data carrier typically comprises a solid state memory device, such as a chip, or a CD, a floppy disc or a DVD, for example. In some embodiments it may comprise a semiconductor chip, or electronic memory, probably a read only memory (ROM).

According to another aspect, the invention comprises a rich media file output device having an output line and a controller capable of accessing a slow access medium drive datastream output of a slow access medium drive, and of accessing a fast access memory datastream of a fast access memory device. The controller is capable of synchronizing said slow access medium drive datastream originating from said slow access medium drive with said fast access datastream originating from said fast access memory device, and of switching data that are fed to said output line from a fast access datastream to a tape drive datastream with substantially no viewer perceivable interruption or discontinuity in datastream output via said output line.

Another aspect of the invention comprises a rich media file output apparatus comprising a control processor, a fast access memory reader, a slow access medium drive, a plurality of fast access data files which are readable by said fast access memory reader, and a plurality of slow access mediums which are readable by said slow access medium drive and are provided in a slow access medium library. The arrangement is such that in use in response to a request being received for a selected rich media file to be played, said control processor is capable of (1) locating a corresponding selected fast access data file having an initial portion of said selected rich media file, and (2) arranging for said fast access data file to be read by said fast access memory reader and to be played out of said apparatus. The control processor is further adapted to cause an appropriate slow access medium to be located in said slow access medium library, wherein said slow access medium comprises data which are representative of a subsequent portion of said selected rich media file. The data are received from the slow access medium sequentially later than said initial portion of said fast access data file. The processor also causes said located slow access medium to be loaded into said slow access medium drive and played. Said control processor is also operative to synchronize signals derived from said fast access memory reader with signals derived from said slow access medium drive and to change what is played out of said apparatus from being from said fast access memory reader to being from said slow access medium drive.

According to another aspect, the invention comprises a network comprising a server, a fast access memory device including an initial portion of a rich media product, and a slow access medium drive usable with a slow access medium having a subsequent portion of said rich media product downstream of said initial portion. The network is arranged such that in use in response to said server receiving a signal representative of a request for a rich media product to be transmitted to a receiver, said server causes (1) said initial portion of said rich media product stored in said fast access memory device to be derived from said fast access memory device and transmitted to said receiver, (2) playing of a slow access medium in said slow access medium drive, and (3) an output of said slow access medium drive to be produced. The controller is operable to synchronize output from said fast access memory device with output from said slow access medium drive. The server is then operable to switch data transmitted to said receiver from being data originating from said fast access memory device to data originating from said slow access medium drive.

According to a further aspect, the invention comprises a method of creating a distributed readable rich media data file. The method comprises storing data representative of an initial portion of said data file in a fast access memory and storing data representative of a subsequent portion of said data file on a slow access medium. Thus the data file is split between fast access memory and slow access memory.

According to another aspect, the invention comprises a sequential data file player for playing a sequential data file from a data carrier. Said data file has at least a first part and a second part. The data carrier includes at least said second part. Said data file player comprises a fast access memory including said first part of said data file, a data reader capable of reading data from said data carrier, and a controller. The controller is adapted, in use, to (1) play said first part of said data file from said fast access memory while said data carrier is readied for reading, (2) read said second part from said data carrier, and (3) join data from said second part to data from said first part in a seamless, temporally contiguous output having at one time data from said first part and at a later time data from said data carrier.

Said data carrier is preferably insertable into, and removable from a data carrier reader. Said data carrier can be considered to be a "slower access memory." Said data carrier could be tape, magnetic disc, (e.g. floppy disc), optical disc, hologram memory, or even memory that has to be retrieved over telecommunications lines, with an associated delay. The "fast start" principle could be used to cover for the time it takes to retrieve remote data.

BRIEF DESCRIPTION OF THE DRAWINGS

The invention will be further described, by way of example only, with reference to the following drawings of which.

DETAILED DESCRIPTION OF THE DRAWING

Figure 1:
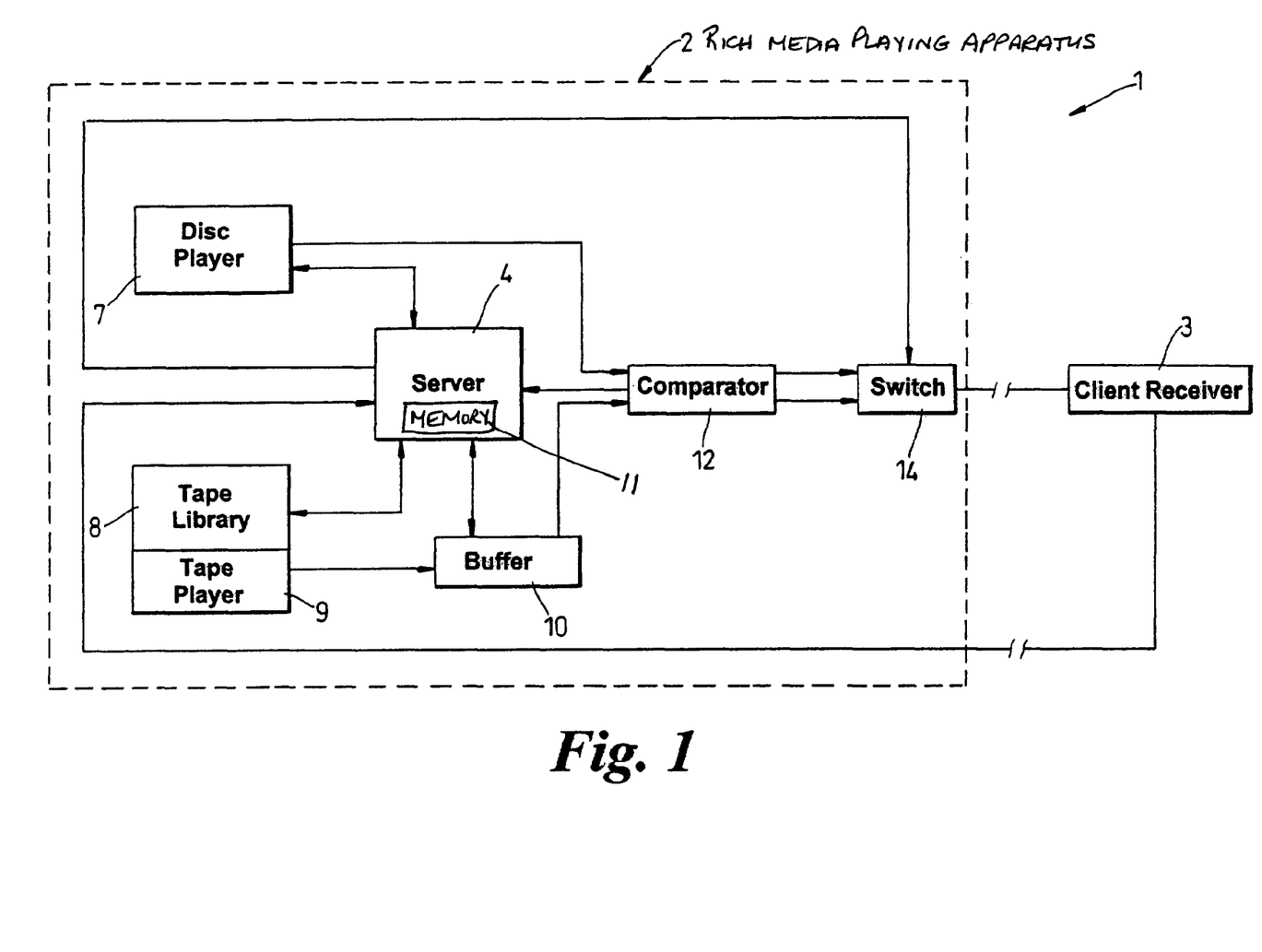
FIG. 1 is a block diagram of a network comprising a rich media playing apparatus and a client receiver to which a rich media product is transmitted.

FIG. 1 is a block diagram of a network comprising a rich media playing apparatus 2 (e.g. a Video Farm or Video Library) which is operative to transmit a rich media data file or product to a client receiver 3. The rich media product is typically a video film or movie which the client (i.e., user or viewer) has requested to view. The rich media product is a sequential stream of data. The client receiver 3 is remote from the playing apparatus 2 and communication between the client and the playing apparatus is achieved via a telecommunications network (e.g. the Internet, or dedicated land lines, telephone lines, or wireless telecommunication). The link between the client receiver 3 and the playing apparatus 2 comprises a network capable of carrying common network protocols, such an IP or UDP.

The playing apparatus 2 comprises a server 4, a relatively slow access memory, e.g., at least one tape drive or player 9 (in this example there is one tape drive 9, but there could be more than one tape drive), an associated tape library 8, and a fast access memory, e.g., magnetic disc drive 7. The output from the tape drive 9 is fed into a buffer 10. The outputs of the buffer 10 and disc drive 7 are fed into a comparator 12 which synchronizes the disc and tape drive outputs. Comparator 12 supplies switch 14 with the fast access data from disc player 7 and the slow access data from buffer 10. The output of the switch 14 is supplied to a telecommunications network port (not shown), or output line, which is linked to the client receiver 3. The client receiver 3, typically a television receiver, comprises a screen for displaying images, loud speakers for producing associated audio, and a data processor which is operative to process signals received from the playing apparatus 2. The receiver 3 also comprises an input device (not shown) which enables the client to input information which is then sent to the server 4 at playing apparatus 2.

The server 4 comprises a data processor and memory 11, i.e., a data storage device (e.g. magnetic disc memory or electronic memory such as EPROM, $E^2$PROM). Memory 11 comprises a metadata store which contains data regarding its encoding and format. The metadata store also holds information indicative of (1) the location of the tape in library 8, and (2) the block address or file mark number on the tape media where the media sample (video movie) is stored. This enables the video movie on tape to be found and loaded into a tape drive and advanced to the correct place by a simple load and seek operation. The disc drive 7 stores the first few minutes of many movies that it is possible for a user to select for viewing (e.g. the first few minutes of tens, or hundreds, or even thousands, of movies). The tapes in library 8 store the remainder or entirety of these movies.

Figure 2:
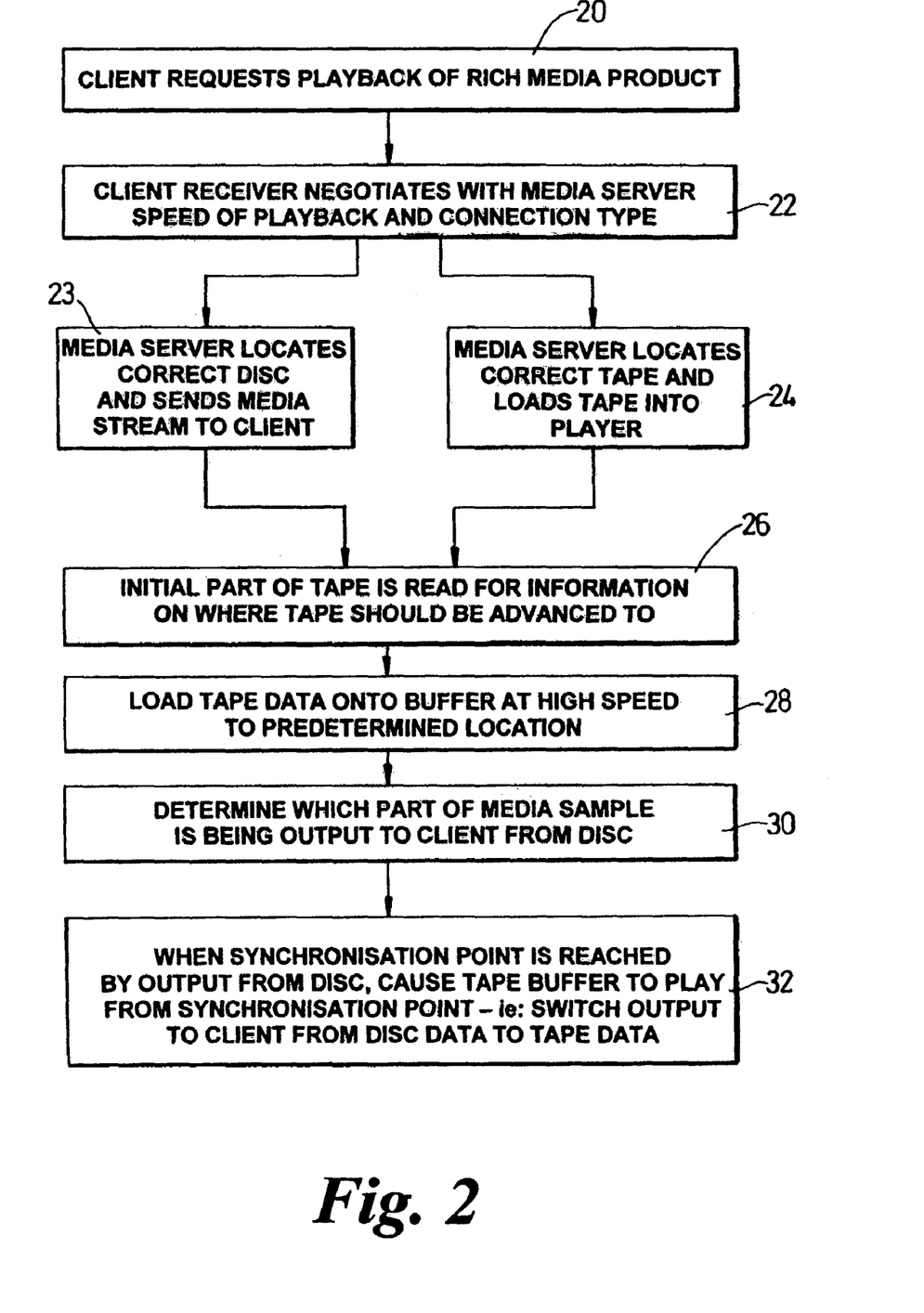
FIG. 2 is a flow chart of the various steps performed by the playing apparatus shown in FIG. 1.

The operation of embodiment shown in FIG. 1 is described in relation to the situation where the client requests rich media product, in particular a video movie or film, to be transmitted to the client receiver 3. Server 4 performs the sequence of operational steps shown in FIG. 2. The steps of FIG. 2 are stored as a computer program in memory 11 of server 4. The client initially inputs into the client receiver 3 data relating to the film which he would like to watch, and this information is then transmitted to the server 4. This is represented as step 20 in FIG. 2.

The server 4 on receiving this information then negotiates with the client receiver 3 to agree on a playing speed and to ascertain a suitable connection type (step 22), e.g. 256 kbit/s formatted in Real Media.

The disc player 7 is provided with a magnetic disc which has stored thereon the first few minutes of each film which the client may request (e.g. 1, 2, 3, 4, 5, 6, or so minutes). In particular the magnetic disc has multiple versions of the initial portions of each film to allow for the various bit rate and format combinations.

In step 23, the server 4 causes the appropriate initial portion of the rich media file to be located in the magnetic disc. Server 4 causes the located initial portion of the rich media file on player 7 to be played on player 7 and transmitted as a datastream to the client receiver 3.

While server 4 is controlling the disc player 7, the server 4 causes the corresponding tape in the tape library 8 to be located and loaded into the tape player 9 (step 24). This locate and load process is conducted by robot arms (not shown) which are caused to move to the location where the tape is held; the location of the tape in the video library is known by the server 4. Then the robot arms convey and load the located tape into the tape player 9.

Each tape comprises data representative of an entire video or film, and data representative of the point to which the tape should be advanced prior to playing from it, as well as synchronization data. Server 4 performs an initial read of a header of the tape (step 26) to determine the point to which the tape is to be advanced. The controller of server 4 knows where the sequential data from the disc drive has reached, and will reach a predetermined time later.

The contents of tape player 9 are played at high speed (step 28) into the buffer 10 to a point on the tape which corresponds to a point in the film which is sufficiently forward of the point that the datastream from the disc being read by player 7 has reached at that instant to enable a seamless, continuous, contiguous, switch to be performed (later on) from outputting the disc data to outputting the tape data, without the viewer noticing the switch.

The tape data accumulates in the buffer 10 (which comprises RAM or other fast access memory device such as a disc). Buffer 10 also stores data which is indicative of the temporal location in the film of each portion of the data. In other words the server 4 retrieves data from the buffer 10 which corresponds to a portion of the film which occurs at a particular time in the film.

The server 4 monitors the progression of the datastream from the disc (step 30).

The initial read of the tape being read by player 9 also provides information relating to the sequence for synchronizing the outputs of the tape player and the disc player 7 in the guise of the synchronization data. The controller of server 4 evaluates markers in the disc data to determine the point in the data sequence that is being derived to determine when the output from the buffer 10 should be transmitted to the comparator 12. More specifically the server 4 switches its output from the output of disc player 7 to the tape data output of the buffer from the point of that data portion in the buffer which corresponds to a particular instant or synchronization point of the film (step 32).

As the datastream produced by the disc player 7 progresses the synchronization point is approached by the disc datastream.

The comparator 12 compares the timing data of the data which is input to the comparator from the disc player 7 with the timing data which is input from the buffer 10 to ensure that both streams of data are indeed synchronous. The comparison data is sent to the server 4. Server 4 performs a comparison analysis by checking that the instantaneous timing data of the disc data portion is the same as the instantaneous timing data of the tape data portion. Such timing data is typically incorporated into the tape and disc at the time tape and disc are produced.

While the synchronization check is being performed the datastream transmitted to the client receiver 3 continues to originate from the disc data.

The synchronization point in the film is before the end of the initial portion data stored on the disc in player 7 so that server 4 checks synchronization before server 4 activates the switch 14 to cause the datastream originating from the tape to be downloaded to the client receiver 3. In other words there is some overlap in data between the data stored on the disc and that stored on the tape.

Accordingly, once synchronization has been achieved the switch 14 is operated by the server 4 to switch the output to the client receiver 3 to data being derived from the tape. The client merely sees the film continue without realizing any discontinuity at the changeover point, and a substantially imperceptible transition is achieved. Although in the above described embodiment synchronization is checked by comparing the timing or position-in-sequence data of portions of the film to ensure that they are the same, in another embodiment the instantaneous data portion of the tape data is compared with the instantaneous data portion of the disc data to ensure that they are identical (i.e. the video data itself is checked/compared, e.g. the audio channel signal).

In another embodiment of the invention, memory 11 of server 4 contains instructions to advance the tape to a specific point, and then perform the other synchronization steps in accordance with a predetermined protocol. Alternatively, or in addition, the disc or a processor-accessible memory includes a memory with data which dictates the specific synchronization protocol. The tape can be advanced to a predetermined point, stopped, and started again when the disc data reaches a certain point. The switch of output from data originating from the disc memory to data originating from the tape can occur after the tape is re-started from its pre-switch resting point. In practical embodiments the tape is played through the buffer so that the viewer never gets video directly from the tape without going through the buffer.

Synchronization data typically comprise data representing a series of recognizable marks or signatures provided by the producer on both of, or one of, the disc data and tape data. The marks could be in addition to the data of the "normal" media product data file that the user wishes to see/experience. The signatures can be a pattern or processed signal derived from the disc and/or tape datastreams.

Although in the above embodiment the entire media product is stored on tape this need not necessarily be the case because of the fast response time of the disc player and the relatively long latency time of the tape locate and load process; for example, an initial period, say the first three minutes of the film, is never received from the tape and so need not be stored on the tape.

The apparatus 2 can be modified to store the most frequently requested products (videos/films) on line using well known cache techniques. For example a Video Library or Video Farm can have very popular videos stored entirely on disc and other videos stored as discussed with the start on disc but the majority on tape. In this way a system can be provided which has less disc memory than if all the videos were stored on magnetic disc memory, but which still allows just as fast start up, as perceived by the user, of the playing of a requested movie.

Looked at in one way, the invention could be thought of as having a cached, pre-loaded, header for the data file (e.g. movie video) and retrieving the remainder of the file from slower to access memory while the fast access memory covers for the slower data-retrieval process.

Figure 3A:
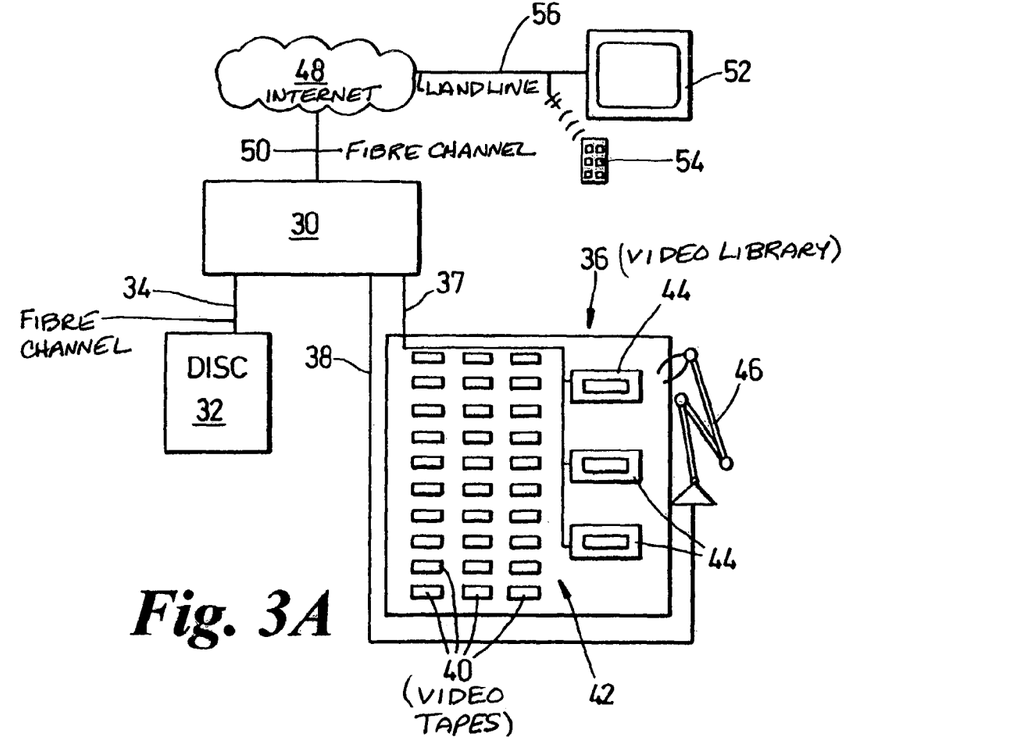
FIGS. 3A and 3B together are a block diagram of another embodiment of the invention.

FIG. 3A is a block diagram of another embodiment of the invention. A controller 30, e.g. a server or a PC, is connected to a disc memory 32 via a fibre channel 34, and to a video library 36 via fibre channel 37 and via a communication line 38.

The video library 34 has a large number of video tapes 40 (in this example, 1000 tapes) held in a video tape bank array 42, several tape drives 44, and a robot arm 46. The tape drives 44 are communicable with the controller 30 via the fibre channel link 34, and the robot arm 46 is controlled by the controller 30 via line 38.

The controller 30 is linked to the Internet 48, or other telecom network; in this example, the link is via land line (fibre channel) 50, but any of the telecom links could be wireless.

A viewer, or user, has a television (TV) 52 and a control handset 54. The TV 52 and handset 54 communicate with the network 50 via a land line 56 (in this example).

Figure 3B:
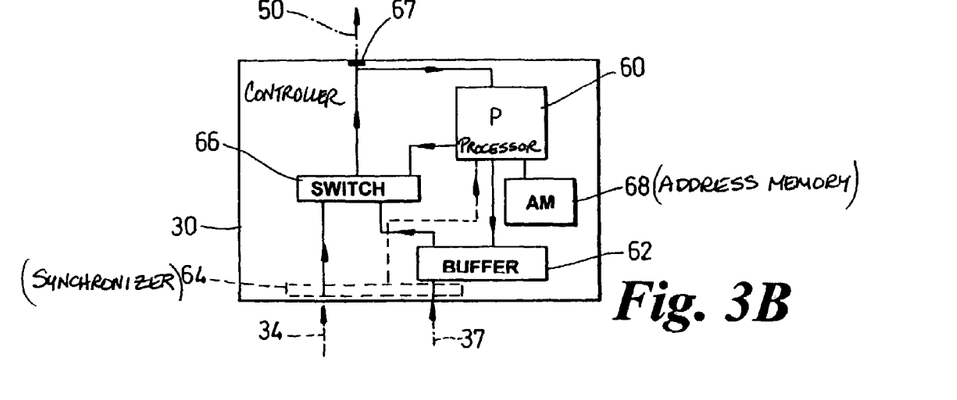

FIG. 3B is a block diagram in more detail of the controller 30. The controller 30 has a main processing unit (P) 60, a buffer memory 62, a comparator or synchronization unit 64, a switch 66, and an address memory (AM) 68.

The disc 32 has a first part, or an initial portion, typically the first few minutes (for example 4 or 5 or 6 minutes), of a large number of video movies stored in it (e.g. the first part of 1000 movies), each at a different address.

The address memory 68 has the disc address of each of the first parts, or initial portions of the movies. All of each of the 1000 movies, including a second part, or a later portion, of the movies (at least carrying on from the first part, or overlapping with it) is stored on respective separate video tape 40 in the library 36 (one movie to one tape). The address memory 68 stores the address/location of each of the video tapes in library 36 and has a concordance database relating the address of each initial portion of the movie on disc to the address of the corresponding video tape.

Figure 5:
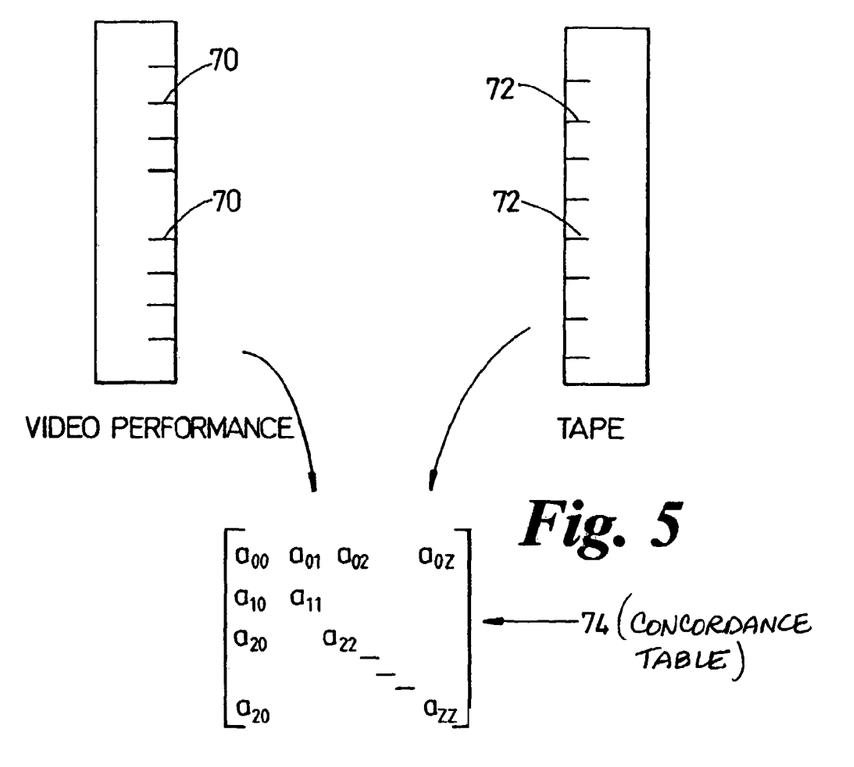
FIG. 5 is a schematic diagram of a concordance table between a video performance's bookmarks separating chapters of the video performance, and a tape's file marks identifying different places along the length of the tape.

FIG. 5 is a diagram of a feature relating to synchronizing the output of the video output of the disc memory of the tape. When video movies are produced it is know to divide the performance up into separate chapters (e.g. different scenes) and video performances with searchable and detectable chapter separations are known. This is schematically represented in FIG. 5, with the bookmarks 70 that are chapter separations of the video performance.

It is also known to have file marks 72 on a tape representing the absolute point along the length of the tape that has been reached. A concordance table or matrix 74 is created relating the video performance bookmarks to the tape file marks so that the points on the tape that correspond to particular bookmarks in the video performance are known.

The address memory 68 has the concordance table 74 for each video film. Alternatively the concordance tables could be associated with the relevant disc memories of the start of the video movie and/or a header portion of each tape (i.e. each disc memory or tape version of a movie could carry its own concordance table).

When a user decides he wants to see a video movie, say for the sake of example "Rocky IX", he calls up a menu of available movies on his TV screen and select, using the user-manipulated controls on their handset 54 "Rocky IX" from the list. This causes a "Rocky IX" signal to be transmitted to the controller 30 (which typically is a server or a PC). The processor 60 then determines which disc address is the correct one for "Rocky IX", and which tape slot address is the correct one for the robot arm 46 to find the correct tape. Controller 30 causes the movie "Rocky IX" to start playing practically immediately and the disc memory output signal is fed through synchronizer 64 and switch 66 to an output port 67 of the controller 30, and thence to the Internet and on to the user.

In fact, since there can be some significant delays in obtaining connections over the Internet, the communications network is perhaps more likely to be a land line network such as a telephone or cable network.

The controller 30/processor 60 causes the robot arm 46 to find the correct video tape for "Rocky IX" and load it in a tape drive 44. Of course, "robot arm" is simply a term for any automatic tape retrieval system which may not have an arm at all.

The controller 30 knows how long it is likely to take the tape retrieval system (e.g. robot arm) to find the tape and transport it to the tape drive and introduce it into the tape drive. Controller 30 therefore knows at what point in the playing of the movie from the disc memory it is feasible to transfer the output to an output originating from the tape (but passing through the buffer). Indeed, controller 30 knows all of the relevant information as soon as it knows what movie is requested.

For each movie there is a chosen switch point at which the intention is to transfer the output that is fed to the port 67 from being from the disc memory to be from the buffer (originally from the tape drive). The transfer is substantially seamless so that the viewer does not notice the difference/the point of switching.

In order to synchronize the exact point of switching the controller 30 uses its synchronizer or comparator 64.

The tape is advanced to a point ahead (in the movie) of where the disc memory output has reached in the sequence of the movie, and is played into the buffer 62, via the synchronizer 64. The synchronizer 64 identifies a particular unique feature in the data sequence coming from the tape (e.g. a specific file mark) and evaluates the signal coming from the disc memory looking for that feature. When synchronizer 64 finds that feature it switches the switch 66 from outputting data up to that feature (including that feature if necessary) from the disc memory to outputting data from that point (and downstream in the datastream) to coming from the buffer 62, starting with the first data downstream of the switch-over marker.

For a video movie with chapter division bookmarks it is convenient, and possibly technically better, to switch at a bookmark (e.g. a scene change, or angle of view change in the movie—at a discontinuity in the movie). To do this the processor 60 knows which movie/video bookmarks are coming up, and the concordance table 74 enables processor 60 to determine what file mark on the tape to use. It may be necessary to calculate a time following the occurrence of a particular file mark 72 that corresponds to a particular bookmark 70, in which case the processor 60 (1) identifies the correct file mark as the mark is played into the buffer, (2) waits for the correct/calculated time, and (3) then switches from disc output to tape output/buffer output.

The processor 60 also knows at what part of the tape to find the particular film in the particular delivery format that is required. For example a single tape may have the same film in two or three (or more) different formats, stored sequentially (or different tape channels). The tape drive can be instructed to read the correct channel, or advance to the correctly formatted part of the tape.

Figure 4:
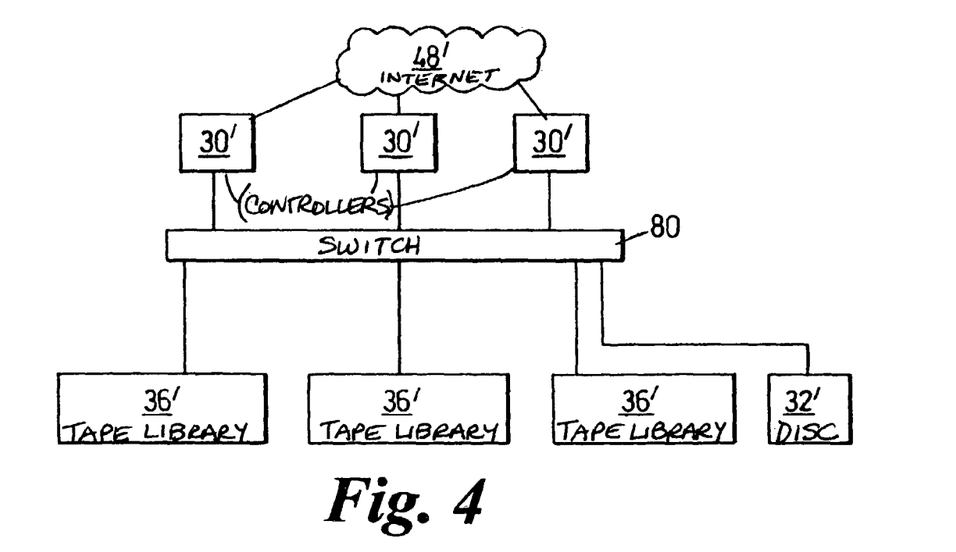
FIG. 4 is a block diagram of a further embodiment.

FIG. 4 is a block diagram of another embodiment. Here there are several controllers 30' connected to a switch 80. Several tape libraries 36' are connected to the controller 30' via the switch 80. In FIG. 4, one disc memory unit 32' is connected to the controllers 30' via the switch 80; in other arrangements there could be more than one disc memory unit in the network.

A user can access one or more controllers 30', depending on access authority and/or telecommunications bandwidth availability. Each controller 30' can access the disc memory 32' and one or more video library 36', again depending upon access authorization and/or telecommunication availability. The telecom network shown in FIG. 4 is preferably SCSI or Fibre Channel.

Synchronization between the disc memory output and the tape memory output can be achieved in a number of ways. For example the disc memory output can be played through a buffer instead of or as well as playing the tape output through a buffer, and the tape output spliced with the disc output in the buffer in advance of the output from the buffer to the output port 67 of the change-over point. Indeed, in one embodiment the disc output is played via a disc buffer memory, the tape output played into a tape buffer memory and the data in the two buffer memories compared to determine the change over point, and a switch switches the output to the output point from being from the disc buffer to being from the tape buffer at the correct point in the video stream in the tape buffer memory.

Figure 6A:
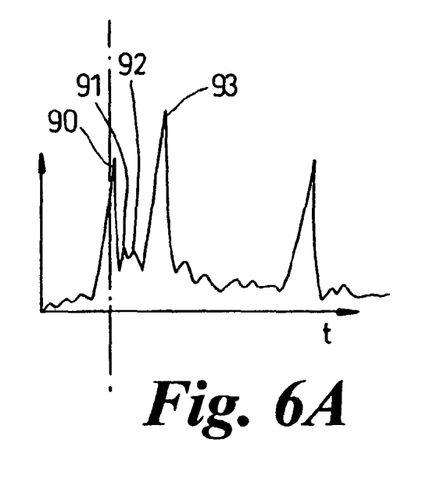
FIGS. 6A and 6B are waveforms for enabling a disc output signal and a tape output signal to be synchronized.
Figure 6B:
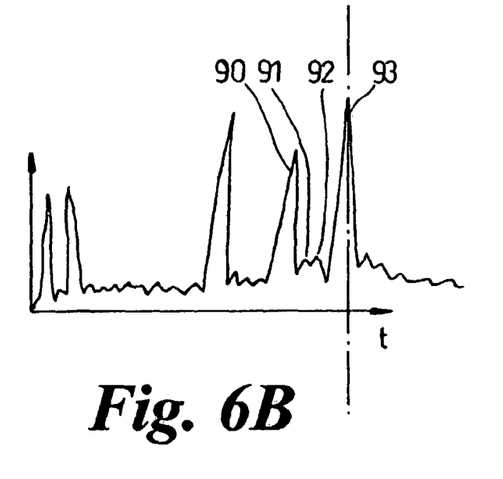

FIGS. 6A and 6B are illustrations of other ways of synchronizing. Instead of having a predetermined/pre-selected marker and watching for that, the systems of FIGS. 6A and 6B monitor the signal from the disc and that from the tape and when they recognize a match in the data they determine its own splice point. For example, FIG. 6A is a waveform of the audio signal as a function of time from the tape (the tape signal going to buffer memory), and FIG. 6B is a waveform of the disc memory audio signal. In response to a characteristic feature being recognized (e.g. peak 90 followed by smaller peaks 91, 92 a few milliseconds later, followed by big peak 93 a further specified number of milliseconds later) in the tape signal, which has been advanced a little way (e.g. a few seconds) ahead of the disc memory signal, the system can look out for that feature in the disc memory signal and use it as a reference point to synchronize the two signals. For example the system recognizes the feature and switch 1.000 second later, knowing where in the tape buffer memory is the signal that is 1.000 seconds after the "signature" characteristic feature.

FIGS. 6A and 6B demonstrate that in some circumstances file marks and chapter marks are not absolutely essential in all embodiments, but they are essential to some preferred embodiments.

Figure 8A:
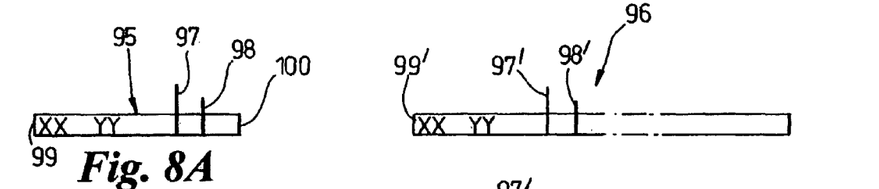
FIGS. 8A to 8C are diagrams of other ways of synchronizing the disc signal and the tape signal.

FIG. 8A is a schematic diagram of a synchronization feature for disc memory data 95 and tape data 96. The disc data start (at time 99) has a primary synchronization marker 97 associated with it at a specific point in the datastream, and a secondary synchronization marker 98 a little time later; the end of the disc data is at time 100. The tape data includes all of the disc data, including the primary and secondary synchronization marks 97' and 98'. Switching is at the occurrence time of primary synchronization mark 97 (a specific signal embedded in or associated with the video data). The secondary synchronization mark 98' provides a second chance to switch if the first one is missed for some reason, e.g., in case the tape drive starts slowly.

Figure 8B:
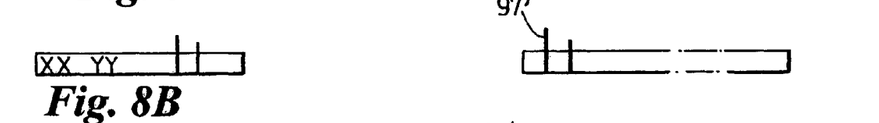

FIG. 8b is a diagram of a similar arrangement except that the tape data 96 does not have all of the initial part of the disc data on it, because switching does not occur before marker 97'.

Figure 8C:
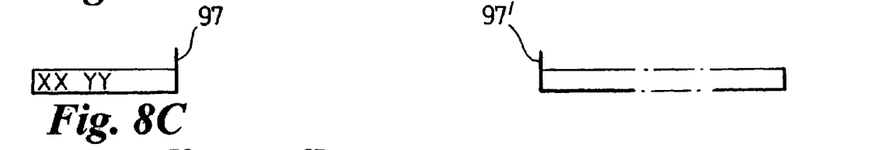

FIG. 8c is a diagram of an arrangement where the disc data ends at, or just after a switching/synchronization marker, and where the tape data does not begin until the equivalent synchronization marker occurs.

Figure 7:
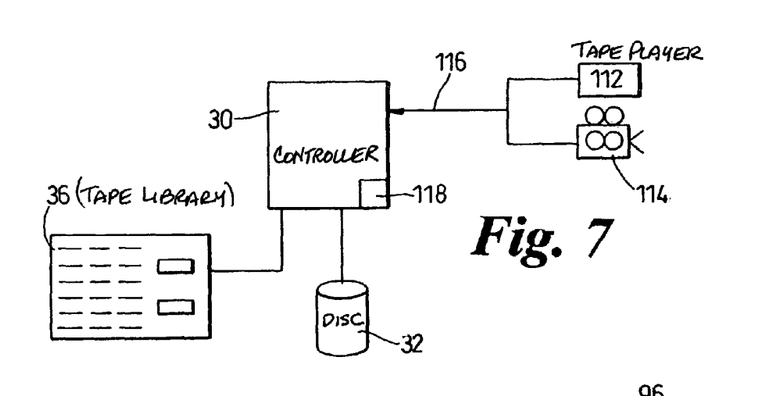
FIG. 7 is a block diagram of a video library and associated controller in accordance with one aspect of the invention.

FIG. 7 is an illustration of a system for the production of a video tape and disc memory pair, and the production of a video library. A control processor 30 is connected to a video library 36 and a fast access disc memory 32. The system of FIG. 7 includes a video movie input mechanism 10, typically the output of a DVD player or tape player 112, or a video camera 114.

The video performance to be stored is supplied to the controller 30 via input line 116 and is edited (if necessary) to produce the movie required. A short sample (only the first few minutes of the movie) is stored on line (in disc memory 32) in a number of different encodings. The time of play of the disc stored sample is calculated such that the time of video performance that can be played from the on-line memory is that time that is enough for the tape library to retrieve a tape from a storage slot and load it into a tape drive and use it for reading from the appropriate point.

The entire video movie (as edited) is stored on the tape media in a number of encodings.

Data about the encodings and format of the different versions of the video movie stored on the tape are stored in memory, for example a metadata store 118 (the address memory 68 of FIG. 3B) to enable the correct tape, and location of the tape in the tape library, and location of the correct place along the tape for a particular formatting of the movie to be found without having to read through inappropriate media. The metadata store typically holds the tape slot location in the tape library, the block address or file mark number on the tape at which the performance in the correct format and correct data rate begins. This information enables a correctly formatted video movie, at the correct data rate for transmission, to be found on the tape with a simple load and seek operation.

A typical user-initiated play operation is as follows:

1. User requests playing of media sample.
2. User system negotiates with media server the speed of play and connection type.
3. Streaming media server starts sending media stream to client; the stream is initially the short "header" of the entire sample.
4. Ancillary process on the media server requests loading of the appropriate tape media into a library slot such that the entire media form can be read back, using the metadata store 118 to locate the appropriate media and location on the media.
5. Media server begins to read from new online copy retrieved from tape media.
6. Once there is "enough" data buffered on the online storage and the buffered data covers forward of the already playing stream, the media server swaps from its original in memory buffer of preliminary parts of the videos to the new buffer stream coming from the tape device.

Another advantage of at least one embodiment of the invention is that because tape memory media and associated tape drives are much cheaper than disc memory and disc drives (of equivalent reliability) it is possible to have more Video Farms for the same amount of money. These can be geographically spread out, so there is the possibility that a user to Video Farm telecommunication pathway will be (i) shorter, and/or (ii) there will be more available pathways. This may reduce the data traffic on long-haul telecomm channels and/or by having a greater number of accessible Video Farms, resulting in a decrease of the bandwidth demanded by a collection of users for access to any one particular Video Farm. This may reduce cost.

It may be desirable to record a movie (data file) at only its highest possible data rate and produce lower output data rates in real time at the controller, if a user's device requests a lower data rate. Similarly, it may be possible to record the movie unformatted, or in one format, and produce other formats in real time, "on the fly", at the controller, or elsewhere in the overall data store-to-user network.

It will be appreciated that not all movies need have the same amount of play time stored in the fast access memory. Those video movies stored on tapes close to the tape drives in the tape library may be insertable into the tape drives significantly faster than those tapes that are stored a long way from the tape drive (the tape-retrieval system will take longer to retrieve them); for those remotely stored tapes, a greater length of play time of the movie is typically recorded in disc memory/fast access memory. The overall aim of many systems is to store as little of a particular movie as is possible in expensive fast access memory, consistent with being sure that the tape (or other data-carrier) can be loaded into its reader and brought on-stream to the correct point prior to the switch from fast access memory to slower access memory.

It will be appreciated that video on tape is a good way of storing a large file (e.g. 20 Mb or 30 Mb) of sequential data. The invention is especially, but not exclusively, applicable to large files. Much of the latency inherent with tape libraries is finding the right tape, and inserting it into the tape drive. Commercial tape drives can run at tens of metres of tape a second and so forwarding a video tape to a point 5 minutes or so into its viewer-perceived run time might take only a few seconds.

It will also be appreciated that although the invention has been described and discussed in relation to tape, because that is cheap and well suited to sequential datastreaming, the same methods and structures can be used with other machine readable data carriers that are insertable into and removable from a reading station. Optical discs (e.g. CD's and DVDs) come to mind readily as being equivalent to video tape in this regard (but are currently more expensive than tape), but removable/re-insertable solid state memory devices (e.g. ROM chips) are envisaged. In each case the time lag created by having to find the correct data carrier, move it to the reading station, and read to the correct point in the data sequence is overcome by having the first (or an early) part of the video (or other) file on a fast access memory, such as pre-installed disc. The fast access memory is fast at least in part because it is already installed, on-line, in the computer. The fast access memory is typically electronic computer memory.

While video movies have been the example of a large data file that is provided with a fast user-perceived start up using the invention, it is understood the invention is applicable to other sorts of data files, e.g. audio only (e.g. music, possibly uncompressed or possibly compressed, for example using MP3), or images only. The invention is especially, but not exclusively, useful for the streaming of sequential data.

While storing an "initial" portion of a performance, or other data file, has been discussed there may be occasions when the absolute start of a data file/performance is not stored in the fast access memory. For example, if "a performance" of a video movie is taken by some people to include trailers advertising other movies, advertisements for products, and the early credits of the movie, the present invention is applicable to situations other than those in which only an early part of the "movie proper" is stored on fast access memory, and not what might be considered extraneous, not relevant, material. It is to be understood that the term "initial portion" covers the situation of the first few seconds (e.g., ten seconds) being removed from a fast access memory that stores the rest of the "initial" portion of the movie in fast access memory.

An advantage of playing the tape through the buffer is that the buffer can provide a "pause" feature to an end user. If an end user transmits a pause signal during the playing of a video movie the datastream output from the tape can be accumulated in the buffer memory temporarily.

In the majority of practical embodiments currently envisaged, the data on the tape are played through the buffer. It is possible that the whole movie can be read from the tape drive into the buffer in a relatively short time (e.g. 10-15 minutes) so the buffer can be streaming to the user. The buffer insulates the user from the mechanical characteristics of the low speed tape drive. Thus, the buffer can in some situations accommodate most of the data on a movie video (e.g. the buffer may be 5 Gb, 10 Gb, 15 Gb, or even 20 Gb or more). It is still cheaper to have a buffer (or even several or many buffers) of that size which temporarily store, electronically, a movie (or most of a movie) than to have a thousand movies permanently stored on expensive fast access memory.

Figure 9:
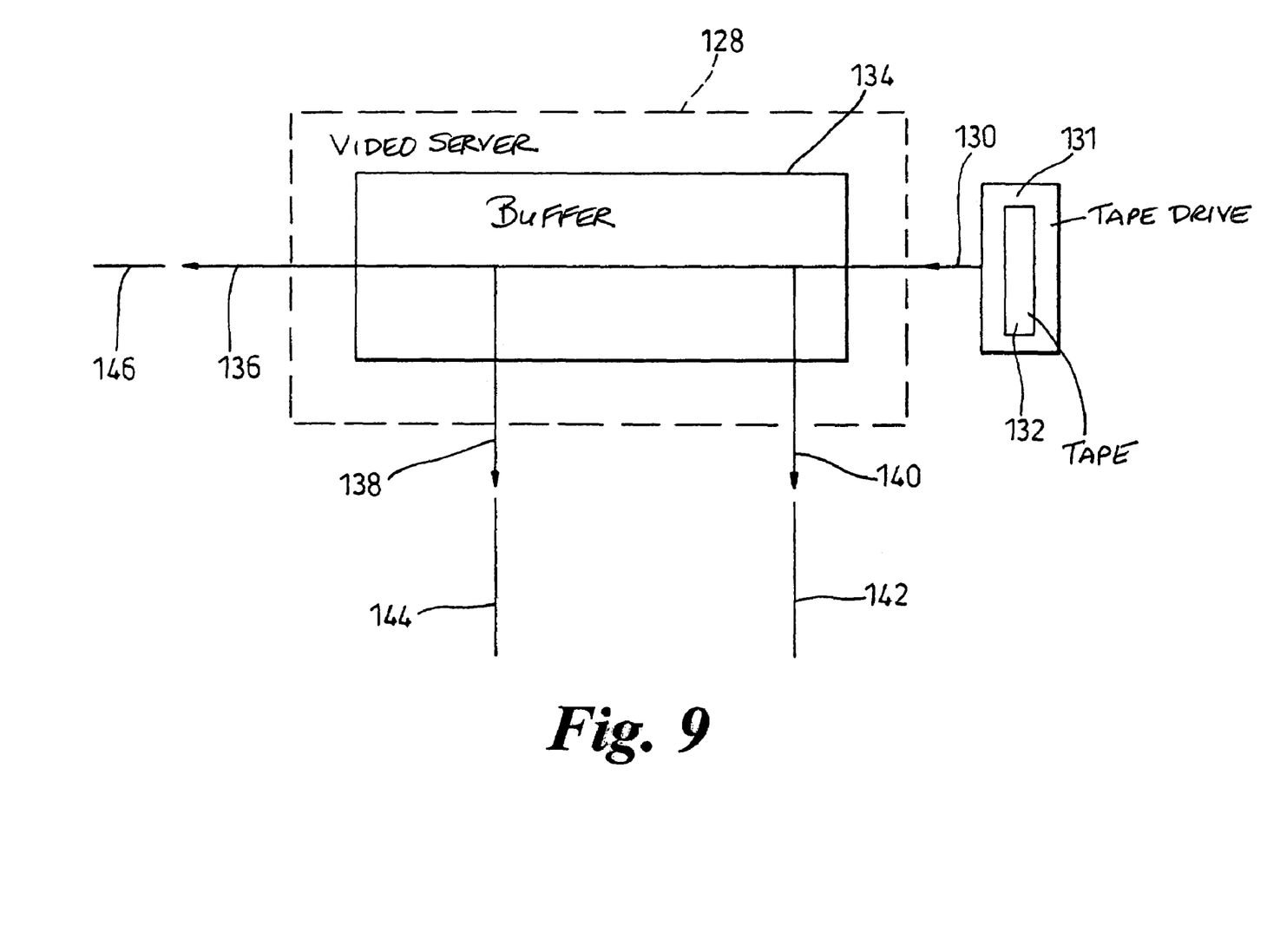
FIG. 9 is a block diagram of another embodiment of the invention.

FIG. 9 is a block diagram of another modification wherein a video server 128 has an input 130 receiving data from a data player, such as a tape drive 131 which is playing data from a data carrier, such as tape 132. Tape data is played into a buffer 134 as a datastream. The buffer 134 has three outputs 136, 138, 140 (in other examples there could be more or fewer outputs from the buffer). The buffer 134 accommodates an amount of normal playing time (playing out time from the buffer). In this example, 20 minutes of video, at normal play speeds. Output 136 takes data at the end (sequentially and temporarily) of the buffer memory, just before the data are lost from the buffer or are written over by new data. Output 138 supplies data for a period (in this example 10 minutes) that are upstream of the point in the datastream at which output 136 outputs data. Output 140 outputs data from a point in the datastream that is even further upstream in the datastream (in this example 20 minutes) than the data at output 136.

In a video on demand scenario a first user can request a video from the video server 128. Server 128 then finds the appropriate video tape, puts it in the tape drive 131, and plays the video tape into the buffer 134. Initially the first user receives video not from the tape, but from a fast start-up arrangement such as has been described previously; from a fast access electronic memory. (If fast start-up of video play to the user is not required there could be a system which does not initially play from a fast start-up source.)

After an initial synchronization period, data from the tape 132 reaches output 140 and is supplied via an output line 142, for transmission to the first user.

After the data has passed the output 142, it progresses through the buffer, e.g. buffer registers, and passes output 138 ten minutes later, and output 136 20 minutes later. If a second user requests the same video as the first user, but does so 6 minutes after the first user, the second user waits four minutes and then receives the video via output 138 which feeds the video to line 144. Similarly, if a third user requests the same video 17 minutes after the first user does so, the third user waits three minutes and then receives the video via output 136 and line 146. The above illustrates the more general feature of waiting for a while until the datastream data reaches an appropriate point to be supplied to a user.

The above pre-supposes that the outputs 136, 138 and 140 have a fixed relationship relative to each other along the datastream of sequential data. It is to be understood that the server 128 can be configured so line 144 and line 146 are at any chosen distance along the datastream from the point in the datastream that is at output 140, within the constraints of how much of the datastream can be accommodated in buffer 134. If buffer 134 is large enough to accommodate the full video file then outputs at any point in the video file can be fed to users, so long as buffer 134 has output lines available to carry them, and output points available to extract video at the chosen point in the datastream. In such a system a second user can request the same video as was being played to a first user via the buffer. If the start of the video movie (or other performance) were still in the buffer 134 a feed from the datastream data can be taken from a point at or near the start of the movie in the datastream sequence of data. This would give the second user fast delivery of the requested movie, possibly without any significant delay as perceived by the user, or with only a delay of the order of a second or two.

Similarly, for third and subsequent users, a feed can be taken from a suitable point in the buffer so the feed coincides with the start of the movie (so long as the start were still in the buffer). In this way a number of users can be served from the same buffer, by taking data feeds from different points in time in the datastream in the buffer.

The buffer can be large enough to hold all, or most, of a movie or other performance.

The use of a buffer with a plurality of data extraction points, particularly with computer-controlled spacing (in time/point in datastream), reduces the amount of computer memory necessary for given large numbers of videos. If a computer memory stored a large number (e.g., a thousand) of videos, the videos could all be accessed straight away. However, such an arrangement would be very expensive in computer memory. Moreover, many of the videos would not be in use at any particular time. Depending upon the number of customers, and how many of the videos were duplicate copies of the currently most favored film, there probably would be approximately nine hundred of the one thousand video files not in use at any particular moment. Indeed it may be that many hundreds of video files would not be used at all in any particular day. Thus in such a scenario many hundreds of the expensive computer memories are not being used.

An alternative to the foregoing approach of the computer memory storing a large number of videos is to have a large number (e.g. one thousand) videos on a removable data carrier, e.g., a tape, CD or DVD, and a much smaller number of large memories (e.g. buffer memories) which are temporarily loaded with a video that has been demanded, and to change the video that is stored in the temporary memory so as to store a different video in the temporary memory if the first video is no longer wanted, and the second video is wanted. In this way it is possible to have a much smaller number of computer memories capable of storing part of a video, or even storing an entire video. If there were one hundred "live"-on-line-videos that have been copied from tape into one hundred buffer memories, there could be another nine hundred tapes in a store ready to be copied to the buffer memories should there be a demand for them. Such a system would require nine hundred buffer memories less than a system which permanently keeps each video in its own electronic memory.

Although previously a fast-start from electronic memory has been discussed in the context of covering up the delay in finding the right tape, the electronic memory could be used to cover up other delays. For example, there are telecommunications delays in accessing remote data files, e.g. over the Internet. It is possible to provide at a local site the start of a large number of data files, with the majority of the data files being present at geographically remote sites, needing telecommunications access/downloading. This accessing and downloading would have an associated delay, which could be covered up by playing the locally available starts of the files.

The synchronization of data need not occur at the data-provider end; it could occur at the data-receiver end. For example, a user could have the synchronization buffer in his TV/video player/access device. This may be especially interesting if the first part of the video is played from a local site, and the second part from a slow to access, geographically remote site. The video/user machine could then have the first part transferred to it very quickly and stored in its buffer, while the second part is searched for, found, transmitted and eventually stored in buffer in the user's machine. Local telecommunications can quickly provide the start while more long-range telecommunications provide later parts of a datastream. Furthermore, the local user's video could even have the first start-up portion of the video stored in its memory. Purely as an example, the first few minutes of the most popular videos could be transmitted to a user's video by telecommunications (e.g. in the early morning when data traffic is light) ready against the event that the user wants to play one of the most popular videos later. The video could, of course, be updated periodically.

It is more efficient in buffer/electronic memory to have one or more buffers for temporarily holding some or all of a video and have a larger library of currently "off-line" videos on tape or other cheaper data storage medium, than to have a full library of full videos in electronic memory.

For example, depending upon usage, and the preferences of the system operators, it is possible to have a large number (e.g. hundreds, a thousand, or more) of videos on tape, and only 10%, 5% or 1% less of that capacity in temporarily occupied buffer/electronic memory. The system can be configured not to allow a video to reside in buffer memory while it is not being supplied to any user if there is a demand for a different video not currently available for playing from buffer memory, i.e. an "unused" video in buffer memory is susceptible to being supplanted in the buffer by another video that is currently being requested.

It will be appreciated that the above advantages apply whether or not the "fast-start" technique is used.

Another use for the buffer is to provide a "pause" function. The buffer can continue to receive a datastream from the tape, or other slower access memory, and accumulate the datastream without outputting it. This could be useful in some circumstances.

In one embodiment there can be n datastream outputs from the buffer, with their relative positions along the datastream being controllable by a controller in response to user demands. There can be m output lines. An output line can be capable of carrying p multiplexed signals. Thus in one embodiment a single video datastream in the buffer can be delivered to (m)(p) users, provided that (m)(p) is not more than n (if it is, then n is the limiting factor). Typically p is about 8.

Although conceptually the above discussion envisages the concept of data moving through a buffer and data feed outputs being movable along the datastream in the buffer so as to take the correct data at the correct time, it will be appreciated that in practice data can be written to memory locations in the buffer and overwritten when it is the turn of the memory locations to receive fresh data (i.e. data written to a fixed memory location and overwritten when the cycle of writing data to a buffer memory location returns to that location). Moving the data feed point along the datastream held in the buffer is equivalent to reading from a selected memory location, and specifying the sequence of subsequent memory locations to be read. Moving data through a buffer and moving the feed point relative to the data in the memory can easily be achieved by writing data to fixed elements in the buffer and moving the read point in an appropriate sequence and at an appropriate speed. FIG. 9 is therefore illustrative of the concept of "multi-feeds from buffer, at controlled locations."

The invention claimed is:

1. A method of playing a rich media file, wherein a first part of said file is on a fast access memory device and a second part of said file is on a slow access memory device; the method comprising:

readying said slow access memory device for playing;

playing, by a playing apparatus having a processor, an output derived from said first part from said fast access memory device while said slow access memory device is readied for playing;

playing, by the playing apparatus, an output derived from said second part from said slow access memory device, wherein the output derived from said first part from said fast access memory device is provided to a first input of a switch, and wherein the output derived from said second part from said slow access memory device is provided to a second input of the switch; and     synchronizing said playing of said outputs derived from said first part and said second part so said outputs derived from said first and said second parts play contiguously, wherein the synchronizing includes operating the switch to select between the output derived from said first part and the output derived from said second part.

2. A method according to claim 1, wherein said slow access memory is readied for playing during playing of said output derived from said first part of said file.

3. A method according to claim 1 wherein (a) said first part has first sequential data having an end and said second part has second sequential data having a start, and (b) data towards said end includes end region data which is substantially the same data as data towards said start and that comprises start region data, and further including synchronizing playing of said end region data and playing of said start region data by playing at least one of said end region data and said start region data through a buffer.

4. A method according to claim 3 wherein said buffer has an output datastream, the method further including temporally registering in said buffer data from said end data region with data from said start data region so as to synchronize data output in said output datastream from a first moment in time originating from said fast access memory device and with a second changeover moment in time originating from said slow access memory device.

5. A method according to claim 3 further including playing both said end region and said start region through said buffer.

6. A method according to claim 3 further including playing said first part and said second part of said file through said buffer, and wherein said buffer has a first part data input, a second part data input, and a datastream output, and causing data derived from said datastream output to be changed from originating at one point in time from said first part data input to originating at a later point in time from said second part data input.

7. A method according to claim 1 wherein said second part includes a sequence of data that is substantially the same as a corresponding sequence of data provided in said first part, the method further comprising advancing said slow access memory device beyond a sequence of data that is being played from said first part.

8. A method according to claim 1 wherein said slow access memory device includes header data representative of at least one marker in said second part of said file, said marker being indicative of a place in said second part of said file at which marker associated data are found, the synchronizing step including responding to the at least one marker.

9. A method according to claim 1 wherein the second part includes a marker indicative of a point in the rich media file at which a changeover in playing said output derived from said first part to playing said output derived from said second part is associated, the synchronizing step including responding to the marker.

10. A method according to claim 1 wherein the synchronizing step includes comparing said output derived from said first part with said output derived from said second part.

11. A method according to claim 1 wherein the slow access memory device includes plural slow access media each including respective second parts of respective rich media files, the method further comprising selecting a chosen slow access medium for playing an output from the chosen slow access medium.

12. A method according to claim 11 wherein there are plural rich media data files each having a respective first part on the fast access memory and respective corresponding second parts on different slow access medium, the method further including playing a selected one of the first parts while readying said corresponding second part for playing.

13. A method according to claim 12 wherein said plural slow access media are in a slow access medium library, the method further including automatically (a) retrieving a selected slow access medium from the slow access medium library, (b) inserting the selected slow access medium into a slow access medium drive, and (c) playing the selected slow access medium; supplying a controller with a request for the playing of a specified rich media file, causing the controller to identify (a) a location of said first part of said specified file in said fast access memory, (b) a location of said corresponding slow access medium in said slow access medium library, and (c) a position on said corresponding slow access medium to which said corresponding slow access medium is to be advanced for playing from said corresponding slow access medium; and causing said controller to play (a) data derived from said first part of said specified file while causing the corresponding slow access medium to he retrieved and placed in said slow access medium drive and advanced to a position where said corresponding second part is to be found, and (b) an output derived from said corresponding slow access medium.

14. A method according to claim 1 wherein said second part has the same data on it as said first part and more data downstream.

15. A method according to claim 1 wherein said second part has on the order of at least ten times as much data of said file on it than is stored in said first part in said fast access memory.

16. A method according to claim 1 wherein said rich media file comprises a video file and wherein said playing of said first and second parts comprises playing said video file so as to present to a viewer said video file with a seamless joint between said first and second parts, as perceived by said viewer.

17. The method of claim 1 in combination with a method of creating a distributed readable rich media data file comprising storing data representative of an initial portion of said data file in a fast access memory and storing data representative of a subsequent portion of said data file on a slow access memory.

18. The method of claim 1 in combination with a method of providing access to data from a library of fast access data records held in the fast access memory device and a library of slower access data records held in the slower access memory device, the access providing method comprising replacing a data record held in said fast access memory with a data record from said slower access memory if there is a greater current demand for said slower access data record than the current demand for said fast access data record.

19. A method according to claim 18 wherein said data records comprise video files.

20. A media playing device for playing a media product file, said device comprising a fast access memory device, a slow access memory device, a control processor, and an output line adapted to output a media datastream;

said fast access memory being configured to store data representative of an initial portion of said media product file and said slow access memory device being configured to read data from a slow access medium including data representative of at least a later portion of said media product file;

said control processor being arranged, upon receiving a request for playing of said media product file, for playing data from said fast access memory over said output line and for preparing said slow access memory device for reading said later portion of said media product file, while said initial portion is being read, and to switch data that is output on said output line from data derived from said fast access memory device to data derived from said slow access memory device, wherein said control processor is configured to perform the switch by selecting the data derived from the slow access memory device rather than the data derived from the fast access memory device.

21. A device according to claim 20 further including a buffer memory adapted to receive data from said slow access memory device and adapted to be used for controlling switching of data output on said output line from the data derived from said fast access memory to the data derived from said slow access memory device.

22. A device according to claim 20 wherein said fast access memory device is arranged for storing sequential data representative of said initial portion of said media product file, and wherein said initial portion has a read duration of not more than ten minutes.

23. A device according to claim 20 wherein said slow access medium is arranged for storing data that comprises said later portion, said control processor being arranged for causing said later data portion to be contiguous with said initial portion stored in said fast access memory device.

24. A device according to claim 20 wherein said slow access medium is arranged for storing said later portion and at least some of said initial portion, said control processor being arranged for causing some overlap in data stored in said fast access memory device and data stored on said slow access medium.

25. A device according to claim 20 wherein said slow access medium has synchronization data on it and media product file data on it, said synchronization data being arranged for causing the control processor to switch data contributing to said output datastream from being from said fast access memory device to being from said slow access medium.

26. A device according to claim 25 wherein said fast access memory device is arranged for storing synchronization data and media product file data, said control processor being arranged to be responsive to the fast access synchronization data and slow access medium synchronization data to control switching of data output on said output line to being from said slow access medium drive.

27. A device according to claim 20 wherein said control processor is arranged for causing a greater proportion of said media product file to be stored on said slow access medium than the proportion of said media product file to he stored in said fast access memory device.

28. A device according to claim 20 wherein said control processor is adapted to have access to an address memory having (a) details of locations of specific slow access media that are playable in said slow access memory device and their content, and (b) addresses corresponding to said initial portions of media product data files recorded on said slow access medium.

29. A device according to claim 28 further comprising a video library having the slow access media adapted to store a library of video files, the slow access memory device adapted to retrieve a selected slow access medium from said slow access media and to insert said selected slow access medium into the slow access memory device, and wherein said control processor is adapted in use to control movement of said slow access memory device using information from said address memory.

30. A device according to claim 20 further including a buffer memory, said fast access memory device being adapted to produce a fast memory datastream, and said slow access memory device being adapted to produce a slow memory datastream, and wherein said control processor is arranged for feeding at least one of said fast memory datastream and said slow memory datastream to said buffer memory.

31. A device according to claim 30 wherein the control processor is adapted in use to monitor data which enters said buffer memory to identify a synchronization switch marker or characteristic, and further comprising a datastream switch adapted to be responsive to said marker or characteristic for causing data on said output line to be switched from the data derived from said fast access memory device to the data derived from said slow access memory device.

32. A device according to claim 20 wherein the slow access medium comprises a tape and the slow access memory device includes a tape reader.

33. The device of claim 20, further including a rich media file output device comprising the output line and said control processor, said control processor being arranged for (a) accessing the slow access medium datastream output of the slow access memory device, (b) accessing the fast access memory datastream of the fast access memory device, (c) synchronizing said slow access memory device datastream originating from said slow access memory device with said fast access datastream originating from said fast access memory device, and (d) switching data that is fed to said output line from being the fast access memory datastream to the slow access medium datastream with no viewer or listener perceivable interruption or discontinuity in datastream output via said output line.

34. The device of claim 20, further including rich media file output apparatus comprising the control processor, a fast access memory reader, the slow access memory device, a plurality of fast access data files which are readable by said fast access memory reader, and a plurality of slow access media which are readable by said slow access memory device and are in a library, the arrangement being such that in use when a request is received for a selected media product file to be played said control processor is arranged for (a) locating a corresponding selected fast access data file, said fast access data file comprising an initial portion of said selected media product file, (b) arranging for said fast access data file to be read by said fast access memory device and to be played out of said apparatus, (c) causing an appropriate slow access medium to be located in said library, said slow access medium comprising data which is representative of a subsequent portion of said selected media product file sequentially later than said initial portion of said fast access data file, (d) causing said located slow access medium to be loaded into said slow access memory device and played, (e) synchronizing signals derived from said fast access memory device with signals derived from said slow access memory device and (f) changing what is played out of said apparatus from being from said fast access memory device to being from said slow access memory device.

35. The device according to claim 20, wherein selection of the data derived from the slow access memory device rather than the data derived from the fast access memory device causes the fast access memory device to be bypassed.

36. A machine-readable non-transitory storage medium containing instructions that upon execution cause a processor to:
cause a first portion of a media file from a fast access memory device to be output as a media datastream to a client device;
cause a slow access memory device to be prepared to output a second, subsequent portion of the media file;

detect a synchronization point between the first portion and the second portion by comparing information associated with the first portion and information associated with the second portion; and in response to detecting the synchronization point, switch the media datastream output to the client device from the first portion output by the fast access memory device to the second portion output by the slow access memory device, wherein the switching causes data output by the slow access memory device to be selected rather than data output by the fast access memory device.

37. The machine-readable non-transitory storage medium according to claim 36, wherein selection of data output by the slow access memory device causes the fast access memory device to be bypassed.

* * * * *